United States Patent [19]

Schülde et al.

[11] 4,207,223

[45] Jun. 10, 1980

[54] PAPER SIZING AGENTS

[75] Inventors: Felix Schülde, Wulfen-Barkenberg; Volker Kulisch, Gladbeck, both of Fed. Rep. of Germany

[73] Assignee: Chemische Werke Huls Aktiengesellschaft, Herne, Fed. Rep. of Germany

[21] Appl. No.: 958,391

[22] Filed: Nov. 7, 1978

[30] Foreign Application Priority Data

Nov. 9, 1977 [DE] Fed. Rep. of Germany ....... 2750070

[51] Int. Cl.$^2$ .............................................. C08L 33/02
[52] U.S. Cl. .......................... 260/29.6 WB; 428/513
[58] Field of Search ............ 260/29.6 RW, 29.6 WB, 260/29.7 W, 29.7 UA; 526/272, 290

[56] References Cited

U.S. PATENT DOCUMENTS

| | | | |
|---|---|---|---|
| 3,211,681 | 10/1965 | Arakawa | 526/290 |
| 3,532,672 | 10/1970 | Takahara | 526/290 |
| 3,900,440 | 8/1975 | Ohara | 260/29.7 UA |
| 3,953,407 | 4/1976 | Hayashi | 526/290 |
| 4,048,422 | 9/1977 | Sackman | 526/272 |

*Primary Examiner*—Paul R. Michl
*Attorney, Agent, or Firm*—Oblon, Fisher, Spivak, McClelland & Maier

[57] ABSTRACT

A paper sizing composition which comprises a mixture of

A. An alkaline aqueous dispersion of acid-group containing aliphatic hydrocarbon resins prepared by polymerizing a $C_4$- cut or a $C_5$- cut or mixtures thereof, obtained during thermal cracking of a hydrocarbon stream and modifying the product by addition thereto of an unsaturated polycarboxylic acid anhydride, wherein the resins have an acid number between 10 and 130 and are present in the dispersion with a solids content of 10–70%; and B. An alkaline solution of a copolymer of an $\alpha, \beta$-unsaturated polycarboxylic acid and a $C_5$-$\alpha$-olefin, wherein the solution has a solids content of 5–50% by weight; and wherein A and B are employed in a ratio of 91:1 to 1:99 relative to the solids content.

32 Claims, No Drawings

PAPER SIZING AGENTS

BACKGROUND OF THE INVENTION

1. Field of the Invention

The invention concerns paper sizing agents on the basis of acid group-containing polymers from unsaturated hydrocarbons of an olefinic character (so-called acid hydrocarbon resins), either alone or in a mixture with co-polymers from unsaturated polycarboxylic acid units with α-olefins or vinyl monomers, possibly in mixture with other resins, as well as the sizing of paper with these sizing agents.

2. Description of the Prior Art

It is known from DT-OS No. 24 02 926 (German Patent Disclosure), that resin sizings, based upon colophonium resin can be used, if one modifies the colophonium resin by reacting it with an α-β-unsaturated carboxylic acid or its anhydride. This "reinforced" colophonium can be extended by the addition of neutral hydrocarbon resins. This resin mixture is recommended, in combination with a volatile base in the form of aqueous dispersions, which require the addition of a protective colloid, such as casein, as a paper sizing agent.

It is further known that solutions or dispersions of co-polymers from carboxylic acids, or their anhydrides with olefins and their conversion products with basic compounds are suitable for paper sizing.

A high degree of sizing can be imparted to the paper with these co-polymers, however the water resistance of papers, sized in this manner, remains low.

These "synthetic" sizing agents, corresponding to the state-of-the-art, also lead—when sizing in-mass pre-sized paper, such as primarily applied in practice—to poorer sizing results than in surface sizing of unsized paper which, for technical reasons, however, is not generally available.

DESCRIPTION OF THE PREFERRED EMBODIMENTS

The present invention concerns sizing materials for paper surface sizing, based upon acid hydrocarbon resins, which, possibly, may be mixed with other, e.g. natural resins. These materials will show good water resistance especially in mixtures with reaction products of co-polymers from α, β-unsaturated polycarboxylic acid-anhydride-monomers and vinyl-monomers with suitable basic components, such as, for example, alkali hydroxides, alkali carbonates, $NH_3$, amines or diamines, and will produce excellent sizing values in both, unsized as well as in-mass pre-sized paper.

This result is surprising for various reasons and was unanticipated. Thus, up to now, only the application of neutral hydrocarbon resins has been suggested for extension of colophonium resin in paper sizing (see DT-OS No. 24 02 926). The application of acid-group containing hydrocarbon resins for surface sizing of paper has, so far, not been described. It could, therefore, not be expected that such resin dispersions would lead to special effects in surface sizing, especially with respect to water resistance. The fact that, beyond this, mixtures of dispersions of acid hydrocarbon resins with solutions of anionic co-polymers of the described type, would lead to sizing results with especially high sizing quality and surprising, small water sensitivity of the treated papers, represents an unexpected synergistic effect.

Subject of this invention, therefore, are paper sizing agents on the basis of:

A. acid group containing aliphatic hydrocarbon resins from polymerized $C_4$ and/or $C_5$ cuts and, possibly from $C_4$-raffinates, which are modified with unsaturated polycarboxylic acid units, especially maleic acid anhydride, with acid numbers of 10 to 130, preferably 30 to 60, and which, possibly, may also contain other synthetic or natural resins, and B. reaction products of co-polymers, on the one hand, from α-β unsaturated polycarboxylic acid units, especially maleic acid anhydride and, on the other hand α-olefins with up to 5 C-atoms or vinyl monomers, especially styrene with basic components.

whereby A is present in the form of an aqueous dispersion of its alkali salts with a solids content of 10 to 70 wt-%, wherein the acid hydrocarbon resins form a solids-content of 10 to 60 wt-%, preferably 30 to 45 wt-%, and, possibly, synthetic or natural resins are added up to 15 wt-%, preferably 3 to 5 wt-% and B represents an aqueous solution with a solids content of 5 to 50 wt-%, preferably 15 to 30 wt-% and A and B are employed in ratios of from 99:1 to 1:99, preferably 97:3 to 70:30, relative to the solids content.

Hydrocarbon resins, suitable as component A in the sense of the present invention are those that are accessible through polymerization (in the presence of Friedel-Crafts-catalysts) of a $C_4$ and/or $C_5$-cut that has been distilled off during thermal cracking of a hydrocarbon stream, possibly with the addition of a $C_4$-raffinate, that consists of isobutene, n-butene-1, cis-trans-n-butene-2, n-butane, isobutane and, possibly traces of butadiene. This may have been obtained by the isolation of butadiene from a hydrocarbon-$C_4$-cut. These hydrocarbon resins are modified after polymerization by reaction (addition) with unsaturated dicarboxylic acid units, such as Maleic acid anhydride, so that they show the following characteristics:

|  | Resins based on $C_4$-cuts | Resins based on $C_5$-cuts |
|---|---|---|
| Acid number | 10–100 | 10–130 |
| Softening Point (Ring and Ball) | 70–130 | 90–140 |

The synthetic resins that are, possibly, used in component A, may be, for example: neutral aliphatic hydrocarbon-natural resins or indene-cumarin resins; as natural resins, for example, colophonium- or root-resins may be used.

For component B in the sense of the invention, co-polymers from α, β-unsaturated dicarboxylic acid units, such as, e.g. maleic acid anhydride, fumaric acid, with α-olefins with up to 5 C-atoms or vinyl monomers, such as styrene and its homologues; vinyl esters, vinyl-pyridine; vinyl amides; vinyl halides; vinyl alcohols; allyl alcohols; vinyl-alkyl ethers; (meth-)-acrylic acid, -esters; -amides; nitriles; indene; cyclopentadiene, dicyclopentadiene; can be employed. In this, the dicarboxylic acid units can be co-polymerized with other monomers in the ratios of between 1:5 to 5:1 and the co-polymers are used in the form of their reaction products in an aqueous or water-free medium with basic components like alkali hydroxides, alkali carbonates, $NH_3$, primary or secondary aliphatic amines or diamines.

The preparation of the sizing agent according to this invention takes place in a simple manner: Initially, the acid hydrocarbon resin and the, possibly also used, natural resin are melted at about 130° C. and mixed in the melt. After cooling, the solidified resin mixture is crushed. In a suitable vessel, water and alkali are prepared, the crushed resin mixture is added and the mixture is heated under stirring. The dispersion temperature is at about 90° to 100° C. The addition of usual dispersants is not necessary. After obtaining a homogeneous dispersion, stirring continues until the material is cool. Subsequently, the aqueous solution of the copolymer-conversion product is added and uniformly stirred. The sizing agent thus obtained is of good fineness and storage stability without requiring the addition of a protective colloid.

The paper sizing agents according to the invention, can be combined with the anionic starches that are usual in paper sizing and can be processed on the sizing presses that are usual in paper production.

Having generally described this invention, a further understanding can be obtained by reference to certain specific examples which are provided herein for purposes of illustration only and are not intended to be limiting unless otherwise specified.

EXAMPLE 1

Sizing agent I

A hydrocarbon resin that was polymerized in the presence of Friedel-Crafts-catalysts, consisting of 75% of a hydrocarbon-$C_4$-cut and 25% of a butadiene-free $C_4$-raffinate, was modified by the addition maleic acid anhydride in such a manner that it showed the following properties:

Acid number: 57 mgKOH/gram
Saponification number: 90 mgKOH/gram
Softening point: 72° C. (ring and ball)
Gardner-color number: 13

42.6 parts by weight of this hydrocarbon resin were dispersed with 6.4 parts by weight of a 20% sodium hydroxide solution and 51.0 parts by weight of water. Added to this dispersion, were 4.7 parts by weight of a 25% aqueous solution of a maleic-acid anhydride copolymer of the formula $$+CH-CH-----CH-CH_2\}_{\overline{n}}$$
$$\quad |\quad\ |\qquad\qquad |$$
$$\quad CO\ CO\qquad\quad C_6H_5$$
$$\quad |\quad\ |$$
$$\quad NH_2\ ONH_4$$

and the sizing agent, thus obtained, was thinned to a solids content of 20 wt-% with water.

Sizing agent II 37.7 parts by weight of the hydrocarbon resin used in sizing agent I, were melted with 4.9 parts by weight of a portugese balsam resin of type WW with an acid number of 165–171 and a ring-and-ball softening point of 71° to 75° C. After solidification, it was crushed and this resin mixture was formulated analogously to I, into a 20-% sizing agent.

Sizing agent III (Comparison)

A resin, produced analogously to the hydrocarbon resin that was used in sizing agent I, but without addition of maleic acid anhydride, with the following properties:

Acid number: <1 mgKOH/gram
Saponification number: <1 mgKOH/gram
Softening point: <94° C. (ring and ball)
Gardner color number: 4 was dispersed corresponding to the sizing agent II and adjusted to a solids content of 20%.

Sizing agents I to III were combined with an anion-active corn starch that is available, commercially under the designation "Amisol 5591," into a 10-% sizing float. The solids ratio of sizing agent to starch amounted to 1.5:8.5. These floats were applied on a laboratory press onto an unsized 80-gram paper. Drying of the paper in the sizing press took place at 140° to 160° C. within about 5 seconds. The sizing values, obtained, are contained in Table 1.

Table 1

| Sizing Agent | | I | II | III | without |
|---|---|---|---|---|---|
| Water uptake | (DIN 53 132) sec | 120 | 120 | * | <1 |
| | g/m² | 23 | 22 | * | 89 |
| Degree of sitting | (DIN 53 145) sec | 290 | 415 | * | 0 |
| Suction Height | (DIN 53 106) mm | 3 | 2 | * | 44 |
| Smoothness (Beck) | (DIN 53 107) sec | 8 | 7 | * | 19 |

*Incompatible with the starch, precipitates.

It can be seen that sizing agents I and II, produced in the sense of this invention, provide the paper with excellent water resistance, while the comparative sizing agent III was totally unable to be formulated into a sizing float with the starch.

EXAMPLE 2

Sizing agent IV

A hydrocarbon resin, polymerized from a hydrocarbon-$C_5$-cut in the presence of Friedel-Crafts-catalysts was so modified by addition of maleic acid anhydride, that it showed the following properties:

Acid number: 62 mgKOH/gram
Saponification number: 72 mgKOH/gram
Softening point: 92° C. (ring and ball)
Gardner color number: 12

25.1 parts by weight of this hydrocarbon resin were melted with 3.3 parts by weight of the balsam resin that had been used in sizing agent II, size-reduced after solidification and this resin mixture dispersed with 4.3 parts by weight of a 20% sodium hydroxide solution and 67.3 parts by weight of water. Added to this dispersion were 8.0 parts by weight of the maleic acid anhydride-co-polymer solution that had been used in sizing agent I and the sizing agent, obtained in this manner, was diluted with water to a solids-content of 20%.

Sizing agent V (comparison)

As a comparison sizing agent, the 25% aqueous solution of the maleic acid anhydride co-polymer alone was employed. Sizing agents IV and V were combined analogously to example 1 and applied on the laboratory sizing-press. The sizing values obtained are contained in Table 2.

TABLE 2

| Sizing Agent | | IV | V | without |
|---|---|---|---|---|
| Water uptake | (DIN 53 132) sec | 60 | 30 | <1 |
| | g/m² | 15 | 22 | 89 |
| Sizing Degree | (DIN 53 145) sec | 365 | 146 | 0 |
| Suction Height | (DIN 53 106) mm | 7 | 16 | 44 |
| Smoothness (Beck) | (DIN 53 107) sec | 2 | 11 | 19 |

The advantage of the sizing agent according to this invention in comparison to sizing agent V is clearly recognizable.

EXAMPLE 3

Sizing agent VI

This sizing agent was produced in the same manner as sizing agent II, with the difference that, instead of the maleic acid anhydride co-polymer that was used in that case, a co-polymer of the following formula was used:

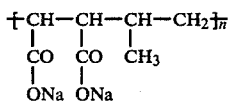

Sizing agent VII

This sizing agent was produced in the same manner as sizing agent II with the exception that the maleic acid anhydride-co-polymer that was used had the following formula:

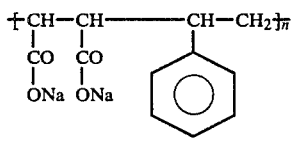

Sizing agent VIII (Comparison)

This sizing agent was produced analogously to II, however, without addition of a maleic acid anhydride-co-polymer solution.

The sizing agents were combined with the starch analogous to example 1 and then applied on the laboratory sizing-press. The resulting sizing values are contained in Table 3.

TABLE 3

| Sizing Agent | | IV | V | VI | without |
|---|---|---|---|---|---|
| Water Uptake | (DIN 53 132) sec | 120 | 120 | 60 | <1 |
| | g/m$^2$ | 21 | 19 | 20 | 89 |
| Sizing Degree | (DIN 53 145) sec | 316 | 289 | 105 | 0 |
| Suction Height | (DIN 53 106) mm | 6 | 7 | 8 | 44 |
| Smoothness (Beck) | (DIN 53 107) sec | 1 | 1 | * | 19 |

*Paper is not stick-free

It can be seen that the sizing agents VI and VII, produced in the sense of this invention, provide the paper with a very good water resistance, while the comparison sizing agent VIII produces a lesser water resistance and, in addition, causes surface defects on the paper.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A paper sizing composition which comprises a mixture of
   A. An alkaline aqueous dispersion of acid-group containing aliphatic hydrocarbon resins prepared by polymerizing a $C_4$-cut or a $C_5$-cut or mixtures thereof, obtained thermal cracking of a hydrocarbon stream, and modifying the product by addition thereto of an unsaturated polycarboxylic acid anhydride, wherein said resins have an acid number between 10 and 130 and are present in said dispersion with a solids content of 10–70%, and
   B. an aqueous solution of a reaction product of a copolymer of an $\alpha$, $\beta$-unsaturated polycarboxylic acid and a vinyl monomer with a basic reagent, wherein said solution has a solids content of 5–50 wt. %, and
   wherein A and B are employed in a ratio of 99:1 to 1:99 relative to the solids content.

2. The composition of claim 1 wherein the hydrocarbon resin in said component A is obtained by polymerizing said $C_4$-cut or $C_5$-cut or mixtures thereof with a $C_4$-raffinate which comprises isobutene, n-butene-1, cis-n-butene-2, trans-n-butene-2, n-butane, isobutane, and traces of butadiene or mixtures thereof.

3. The composition of claim 1 wherein the hydrocarbon resins of said component A have an acid number between 30 and 60.

4. The composition of claim 1 wherein the aqueous dispersion in said component A further comprises up to 15% of a natural resin selected from the group consisting of colophonium and root resins.

5. The composition of claim 4 wherein said natural resin is present in an amount of from 3–5% by weight.

6. The composition of claim 1 wherein the aqueous dispersion in said component A further comprises up to 15% of a neutral hydrocarbon resin.

7. The composition of claim 6 wherein said neutral hydrocarbon resin is present in an amount of from 3–5% by weight.

8. The composition of claim 1 wherein the hydrocarbon resin in said component A is present in an amount of 10–60% by weight.

9. The composition of claim 8 wherein said resins are present in an amount of from 30–45% by weight.

10. The composition of claim 1 wherein the unsaturated polycarboxylic acid anhydride in said component A is maleic anhydride.

11. The composition of claim 1 wherein the $\alpha,\beta$-unsaturated polycarboxylic acid in the copolymer of said component B is selected from the group consisting of maleic anhydride and fumaric acid.

12. The composition of claim 1 wherein the vinyl monomer in component B is selected from the group consisting of styrene, vinyl pyridine, vinyl alcohol, allyl alcohol, vinyl-alkyl ether, acrylic acid or methacrylic acid and the corresponding esters thereof, the corresponding amides thereof, the corresponding amides thereof, and the corresponding nitriles thereof, indene, cyclopentadiene, dicyclopentadiene, and mixtures thereof.

13. The composition of claim 1 wherein the solution in said component B has a solids content of 15–35% by weight.

14. The composition of claim 1 wherein the ratio of components A and B is 97:3 to 70:30 relative to the solids content.

15. The composition of claim 1 wherein said component B comprises a copolymer of styrene-maleic acid semi-amide.

16. The composition of claim 1 wherein the copolymer in said component B is used in the form of its reaction product in an aqueous or water-free medium with a basic component selected from the group consisting alkali metal hydroxides, alkali metal carbonates, ammonia, primary amines, secondary amines and mixtures thereof.

17. A method of sizing paper by treating said paper with a composition which comprises a mixture of A. An alkaline aqueous dispersion of acid-group-containing aliphatic hydrocarbon resins prepared by polymerizing a $C_4$-cut or a $C_5$-cut or mixtures thereof, obtained during thermal cracking of a hydrocarbon stream, and modifying the product by addition thereto of an unsaturated polycarboxylic acid anhydride, wherein said resins have an acid number between 10 and 130 and are present in said dispersion with a solids content of 10–70%; and B. an aqueous solution of the reaction product of a copolymer of an $\alpha$, $\beta$-unsaturated polycarboxylic acid and a vinyl monomer with a basic reagent, wherein said solution has a solids content of 5–50 wt.%; and wherein A and B are employed in a ratio of 91:1 to 1:99 relative to the solids content.

18. The method of claim 17 wherein the hydrocarbon resin in said component A is obtained by polymerizing said $C_4$-cut or $C_5$-cut or mixtures thereof with a $C_4$-raffinate which comprises isobutene, n-butene-1, cis-n-butene-2, trans-n-butene-2, n-butene, isobutane, traces of butadiene or mixtures thereof.

19. The method of claim 17 wherein the hydrocarbon resins of said component A have an acid number between 30 and 60.

20. The method of claim 17 wherein the aqueous dispersion in said component A further comprises up to 15% by weight of a natural resin selected from the group consisting of colophonium and root resins.

21. The method of claim 20 wherein said natural resin is present in an amount of 3–5% by weight.

22. The method of claim 17 wherein the aqueous dispersion in said component A further comprises up to 15% by weight of a neutral hydrocarbon resin.

23. The method of claim 22 wherein said neutral hydrocarbon resin is present in an amount of 3–5% by weight.

24. The method of claim 17 wherein the hydrocarbon resins in said component A are present in an amount of 10–60% by weight.

25. The method of claim 24 wherein said hydrocarbon resins are present in an amount of 30–45% by weight.

26. The method of claim 17 wherein the unsaturated polycarboxylic acid anhydride in said component A is maleic anhydride.

27. The method of claim 17 wherein the $\alpha$, $\beta$-unsaturated polycarboxylic acid in the copolymer of said component B is selected from the group consisting of maleic anhydride and fumaric acid.

28. The method of claim 17 wherein the vinyl monomer in component B is selected from the group consisting of styrene, vinyl pyridine, vinyl alcohol, allyl alcohol, vinyl-alkyl ether, methacrylic or acrylic acids, and the corresponding esters thereof, corresponding amides thereof, and corresponding nitriles thereof, indene, cyclopentadiene, dicyclopentadiene and mixtures thereof.

29. The method of claim 17 wherein the solution in said component B has a solids content of 15–30% by weight.

30. The method of claim 17 wherein the ratio of components A and B is 97:3 to 70:30 relative to the solids content.

31. The method of claim 17 wherein said component B comprises a copolymer of styrene-maleic acid semiamide.

32. The method of claim 17 wherein the copolymer in said component B is used in the form of its reaction product in an aqueous or water-free medium with a basic component selected from the group consisting of alkali metal hydroxides, alkali metal carbonates, ammonia, primary amines, secondary amines and mixtures thereof.

* * * * *